Figure 1:
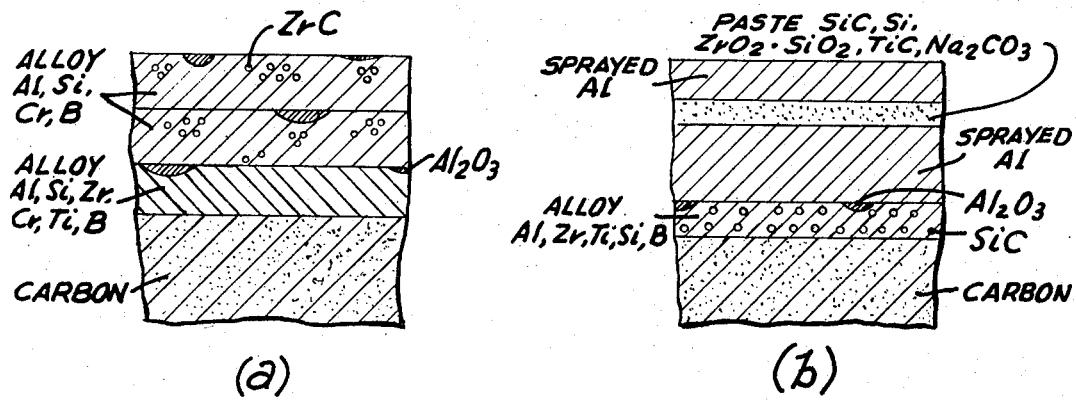

Oct. 24, 1967   A. J. VALTSCHEV ETAL   3,348,929
PROTECTING CARBON MATERIALS FROM OXIDATION
Filed Jan. 30, 1963

INVENTORS
ALEXANDER JORDANOV VALTSCHEV
TEMENUSHKA NIKOLAVA VALTSCHEVA
BY
McGlew & Toren
ATTORNEYS.

United States Patent Office 3,348,929
Patented Oct. 24, 1967

3,348,929
PROTECTING CARBON MATERIALS
FROM OXIDATION
Alexander Jordanov Valtschev and Temenushka Nikolova
Valtscheva, Sofia, Bulgaria, assignors to Metalurgitschen
Zavod "Lenin," Pernik, Bulgaria
Filed Jan. 30, 1963, Ser. No. 255,126
Claims priority, application Germany, Apr. 16, 1962,
M 52,521; Japan, Sept. 28, 1962, 37/41,965
17 Claims. (Cl. 29—180)

This invention generally relates to carbonaceous material such as carbon proper and graphite (hereinafter referred to as "carbon material"), and is particulaly directed to a procedure for imparting carbon material with protective oxidation-preventing coatings.

Considered from another aspect, the invention is concerned with the production of electrodes of carbon material which are highly resistant to oxidation.

As is generally known, carbon material is particularly suitable for various kinds of uses under high temperature conditions as carbon material displays exceptional properties at elevated temperatures. Thus, for example, the evaporation temperature of carbon material is extremely high and evaporation takes place without intermediate melting. Further, the coefficient of linear expansion is very low, even at relatively high temperatures. Another beneficial property of carbon material is its high degree of heat conductivity. Further, the strength and stability of carbon material, in fact, increases with the temperature, a feature which, of course, is most beneficial for many purposes. It should also be mentioned that the electric conductivity of carbon material remains almost constant under varying temperature conditions, which again is a very advantageous characteristic. Generally speaking, there is no other material available for high temperature operations which possesses the combination of favorable characteristics of carbon material. However, as is also well known, carbon material has a very important shortcoming, that is, it is easily oxidized at relatively low temperatures. For this reason, the use of carbon material under high temperature conditions has, in practice, been severely restricted, and in many cases an otherwise desired employment of carbon material for high temperature operations could not be effected due to the tendency of the carbon material to oxidize. Generally, if carbon is used under high temperature conditions in an oxidizing atmosphere, this entails great expense on its part.

A major use of carbon material under high temperature conditions is, of course, as carbon electrodes used in electrothermal processes employing electric arcs. According to statistics published in the pertinent literature, the consumption of carbon electrodes is chiefly dependent on the degree of oxidation of the surface of the heated electrodes. Evaporization and pulverization of the electrodes caused by the electric arc is only a minor cause for electrode consumption and, in fact, only 6 to 30% of the consumption is due to such pulverization. The oxidation of carbon electrodes usually takes place at temperatures ranging between 400 and 1600° C. As, of course, a great number of substances are available which resist such temperatures, various proposals have been advanced in the literature to protect carbon material with such substances in order ot minimize, if not prevent, the oxidation of the carbon. Thus, for example, carbon electrodes have been coated with ceramic and metallic constituents or the carbon surface has been impregnated with various chemicals. All these prior art attempts, however, have not been entirely successful.

A considerable difficulty in protecting carbon from oxidation is caused by its low coefficient of linear expansion $\lambda = 1.5$ to $5.5 \times 10^{-6}$. Most fireproof materials have a linear coefficient of expansion of over $7 \times 10^{-6}$. As a result of this, the coatings crack and fall off upon repeated heating and cooling.

There do exist high-grade coatings of silicon compounds such as silicon carbide, molybdenum disilicide and titanium disilicide. These coatings show a much better link with carbon and they do not crack and peel off as a result of temperature changes on account of their suitable coefficient of expansion. The process of their application to the surface, however, is very expensive.

The coatings of silicon carbide are usually obtained by means of gas silication. This process demands prolonged heating of the entire carbon article at temperatures above 1500° C. and in a special atmosphere.

The coatings of molybdenum disilicide and titanium disilicide are usually effected by applying a smear of these substances and by heating the entire article to temperatures ranging between 1500° and 2000° C., in a protective atmosphere such as argon. There exist also methods according to which the carbon article is immersed in the molten silicide, this being done at very high temperatures and in a protective atmosphere.

Their high cost is not the only shortcoming of these coatings. There is a sharp increase in the chemical activity of the substances under conditions of high temperature. As a result of this, the coatings are destroyed at considerably lower temperatures than could be expected. For instance, the highest temperature for a durable utilization of coatings of silicon carbide and molybdenum disilicide is not more than 1500° C.

The thin layer of silicon dioxide which is formed over the silicon carbide and protects it from oxidation begins to act as an oxidizer at temperatures of over 1500° C. The destruction of the silicon carbide under these conditions follows the reactions:

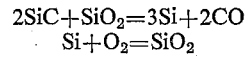

$$2SiC + SiO_2 = 3Si + 2CO$$
$$Si + O_2 = SiO_2$$

The protective coating of molybdenum disilicide on carbon is destroyed on account of the accelerated diffusion of the carbon in the coating under conditions of high temperature. The binary system "molybdenum-silicon" is transformed into a ternary system of "molybdenum-silicon-carbon." Molybdenum carbide which possesses no protective properties is easily oxidized at the surface of the coating according to the folowing reaction:

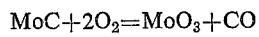

$$MoC + 2O_2 = MoO_3 + CO$$

At high temperatures, both products of the above reaction are gases.

In view of its low melting point (1540° C.), titanic disilicide cannot be used as higher temperatures.

Generally speaking, the high-grade protective coatings for carbon known so far are very expensive and can be utilized for a long period of time only at temperatures under 1500° C.

Graphite articles which are most widely produced and used at the present moment are the graphite electrodes used in the steel furnaces of the electric-arc type. Protective coatings for graphite electrodes can find industrial application only if they can withstand temperatures of at least 1650° C. and are sufficiently low-priced. The coatings known at present do not conform to these two requirements and hence they have not been applied on an industrial scale.

Accordingly, it is a primary object of this invention to provide carbon material with a heat resistant coating which is firmly united with and bonded to the carbon material proper and which is not affected by temperature fluctuations. This coating is to be impervious to gases and chemically resistant under the respective conditions of operation.

Still another object of this invention is to provide a carbon electrode, e.g. for use in arc furnaces, which electrode has an oxidation-preventing coating which is electroconductive and which is firmly united with the carbon material proper.

Generally speaking, it is an object of this invention to improve on the art of coating carbon material including carbon electrodes.

The words "coating" and "layer" are used to denote different things. The finished coating of the carbon article generally consists of several successive coatings each one of which has a different chemical composition and is applied or treated in a different manner.

Very often, on account of a number of considerations of a different character, the application and treatment of a particular coating cannot be done in a single operation. In such cases, the particular coating consists of several layers which possess principally a related chemical composition and are applied and treated in almost the same manner.

In some cases, a particular coating must contain small quantities of certain substances which cannot be applied in the manner in which the coating itself has been applied. These substances, applied between two layers of identical successive coatings, are called "layers" as well.

Generally, the term "coating" is applied to the separate types of coating which have a related chemical composition and are applied and treated in the same manner, as well as to the finished coating of the carbon article, regardless of how many coatings it may consist. The term "layer" is used to denote one of the various layers of a one-type coating as well as thin films which are applied between the layers of the one-type coatings.

Briefly, and in accordance with this invention, we have found that aluminum alloys and carbide (or nitride) materials could be welded onto the carbon surface by means of electric arc. The term "welding-on" as used herein always refers to electric arc treatment. The process of welding-on is cheap and highly productive. As explained in greater detail further on, the protective coating obtained during this process is consecutively subjected to treatment at temperatures of over 2200° C. The treatment proper, i.e. the process of heating in the arc, lasts from 0.1 to 0.3 sec. Due to the brief treatment period there is no need of protective atmosphere, this in itself being a great advantage. On the other hand, irrespective of the high temperature of processing, the article on which the coating is applied, such as an electrode, is heated to a much lower temperature—about 200° C.—which makes the entire process a very cheap one.

Welding-on by means of electric arc can successfully be applied within broad limits—from 100 percent carbides and 0 percent aluminum to 0 percent carbides and 100 percent aluminum alloy. In the first instance, 100 percent carbides, it is silicon carbide which is mainly used. When the content of aluminum increases, the silicon carbide can be entirely substituted by other carbides such as boric carbide, titanium carbide, zirconium carbide, chromium and molybdenum carbides, as well as by titanium nitride and zirconium nitride. However, increasing the aluminum content of the coating must be accompanied by adding carbide-forming elements such as boron, silicon, titanium, zirconium, chromium and molybdenum. This must be done independently from the carbides used because when the aluminum is increased the carbides cease being the basic skeleton of the coating and become a filling. Besides that, the separate grains of the carbides, or of the nitrides, respectively, are included in the aluminum alloy.

By its essence, the welding-on of an aluminum alloy by means of electric arc is a pyrometallurgical process performed in the presence of a great surplus of aluminum. It is obvious that all elements and compounds, with the exception of those which show great stability at high temperatures such as most of the carbides, will form alloys with the aluminum. When titanium disilicide is used, for instance, it can no longer be found as a particular chemical compound in the coating after the process of welding-on. The result is rather a ternary "aluminum-titanium-silicon" alloy.

Besides that it is quite natural that substances like molybdenum and chromium carbides which, comparatively speaking, oxidize more readily, can stand this brief high-temperature treatment without undergoing any changes since the great surplus of aluminum protects them from oxidation.

On the other hand, the desired carbide-forming elements can be introduced as oxide compounds such as diboric trioxide, titanic dioxide, dichromic trioxide, etc. With the utilization of an outer source of heat such as electric arc the oxides react with the aluminum and are reduced to the respective metals

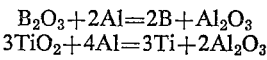

$$B_2O_3 + 2Al = 2B + Al_2O_3$$
$$3TiO_2 + 4Al = 3Ti + 2Al_2O_3$$

It follows from the above that it is possible to use both separate oxides and oxide systems such as titanium silicate, titanium silicoborate, etc.

In its most general aspect the coating is of the following type: a homogeneous aluminum alloy with inclusions of grains of carbides (nitrides respectively) and of bialuminum trioxide. The latter can be introduced as an initial substance or can be obtained as a result of the reactions described.

The aluminum alloy can be absent in the final instances, as is the case with weldings-on of carbide where the coating represents carbide grains welded to one another, or it may contain no visible carbide inclusions, as is the case with aluminum weldings-on where carbides are not used as initial substances. The presence of aluminum trioxide is chiefly determined by the extent to which the desired elements have been introduced as oxides.

It follows from all that has been said above that there exists great freedom in the utilization of initial substances and that great number of compounds and alloys can be used. The following example will serve to make this clearer: Three different recipes can be used to obtain a coating composed of 65 percent aluminum, 20 percent silicon, 10 percent zirconium and 5 percent boron, namely:

(1) 65 parts of aluminum, 20 parts of silicon, 10 parts of zirconium, and 5 parts of boron;
(2) 71.2 parts of aluminum, 20 parts of silicon, 12.5 parts of zirconium-boron alloy (20 percent boron), and 12.2 parts of boric acid.
(3) 72.9 parts of aluminum, 16.9 parts of silicon, 20.0 parts of zirconium silicate, and 5 parts of boron.

A calculation made indicates that the alloy obtained from the three recipes has the same composition. The difference lies only in the different content of bialuminum trioxide in the coatings. It is 0 percent upon applying recipe (1), 11.7 percent with recipe (2), and 14.9 percent with recipe (3).

In view of its chemical stability and high degree of refractoriness, the content of bialuminum trioxide does not affect the quality of the coating within certain limits.

In practice, the substances used in making the coatings are in the form of powder and are applied as suspensions. One exception to this rule is aluminum which can be applied both as aluminum powder and by means of metallization.

It is a common practice to apply the greater part of the aluminum by metallization, the remaining part being applied as a suspension in mixture with silicon carbide and other substances.

Coatings of this kind which are welded on the carbon surface adhere reliably to the carbon material so that, in fact, an integral structure of carbon and coating is obtained from which the coating does not flake, chip or otherwise is removed, even under conditions of great stress. Further, the coating is not affected by rapid and significant temperature changes, is capable of wetting by certain oxide fusions and does not react with them even at extremely high temperatures.

When part of the aluminum is applied by means of metallization, the protective coating obtained is sufficiently impervious to gases. A porous coating is obtained in the process of welding-on, if the aluminum is applied in the form of aluminum powder mixed with silicon carbide and other substances. With a view to rendering this coating impervious to gases, the welded-on coating may be subjected to an additional electric arc treatment. As the result of this operation, the layer partially fuses or melts so as to form a compact and dense coating, impervious to gas.

The method of welding-on by means of electric arc can be successfully applied up to a certain layer thickness. The maximum thickness is different for the different initial substances used and varies from 0.5 to 1.0 mm.

There are many purposes to which one layer welded onto the carbon is not sufficient to ensure the desired duration of protection, as under certain conditions of operation the coating must often be in contact with harmful substances which gradually destroy it. Such objectionable substances are alkali oxides, alkali-earth oxides, and the oxides of certain heavy metals such as zinc, lead, etc.

As a rule, the protective coatings of the graphite electrodes used in electric furnaces for steel consist of two, three or four layers welded one on top the other. The number of layers depends on the capacity of the furnace, on the diameter of the electrodes, and on the nature of the process involved. The protective coatings of electric-resistance elements made of graphite have from two to six layers welded one on top the other.

Carbon articles are used under a great variety of conditions. In some instances they are subjected to the highest possible temperature below the decomposition point. Great endurance of the coating and the absence of all defects therein are necessary in other instances. The coating must usually be electroconductive though in some instances it must not conduct electric current.

A particular composition of the layers welded on is necessary in each single instance in order to obtain the desired properties. For instance, increasing the content of boron in the aluminum alloy improves the cohesion with the carbon but at the same time it lowers the temperature of decomposition. A great increase of the content of chromium in the aluminum alloy results in greater resistance to oxidation but the coating becomes sensitive to frequent changes of temperature. Increasing the quantity of the carbides, such as silicon carbide, titanium carbide and others, renders the coating resistance to frequent changes of temperature though it reduces its degree of impermeability to gases.

The above specific properties of separate elements and of compounds of theirs constitute only a small part of the regular trends which have been established in this field. Their purpose is simply to show that the essence of this invention is not to create a coating with a strictly determined composition for one particular purpose. Using the method of welding on by means of electric arc and the subsequent additional treatments of the coatings which will be described further on, it is possible to obtain a wide range of coatings of various properties and with maximum endurance to heat between 1550° C. and 1820° C.

In practice, the coating of the heat resistant material on the carbon material is effected as follows: When the aluminum is applied as aluminum powder, the desired blend is mixed with a liquid binder or adhesive so as to form a paste or slurry. The paste is then evenly smeared over the surface of the carbon article to be coated. The application of the paste to the carbon article may, of course, be effected in any manner known per se as, for example, by a brush, by pulverization, immersion or the like. Once the carbon article has been coated with the smear, the coated article is heated to a suitable temperature ranging from 50 to 500° C. Arc welding is then effected in the following manner: A direct current arc is employed, the anode (+) being connected to the carbon article, while the cathode (−) is connected to a small, preferably tapered, graphite electrode. Current is then applied and the arc thus formed between the graphite cathode and the carbon article constituting the anode causes the welding of the heat resistant coating material on the carbon surface, while the binder material and any solvent which may be still present burns off (see also FIG. 2).

When the aluminum or a part thereof is applied by means of metallization, the carbon article is first metallized in a familiar manner, e.g. by electric arc metallization, metallization by gas flame, high frequency metallization, etc. The smear of the desired composition is then applied on the metallized layer. The further treatment is then effected as described above.

As has already been indicated, it is possible to weld only one layer, though for a great number of purposes it is necessary to weld several layers one on top the other.

In many instances, carbon articles provided with protective coatings formed by arc welding may be used directly without any further treatment.

In other instances, the welded-on coating may subsequently be metallized by means of aluminum in any manner known per se.

When aluminum is metallized in quantities exceeding 1 kg./m.², it is almost always necessary to carry out the metallization in two layers. Between the layers are applied substances to correct the chemical composition. Under conditions of higher temperatures, these substances reduce the point of softening of the coating. Further, they reduce the coefficient of linear expansion of the coating and bring it closer to that of the carbon.

In actual practice, it is possible to add a great number of substances here, as is the case with weldings-on by means of electric arc. Upon electric arc treatment, the aluminum alloy is obtained immediately as a result of briefly heating to a temperature of over 2000° C. In this particular instance, there is no heating involved in the process of making the coating. However, the same reactions take place upon using the protected carbon article at temperatures over 1500° C., though over a longer period of time.

As, in view of practical considerations, the requirements towards a metallized coating are lower, compared with a welded-on coating, the substances used here are less. They are usually the elements boron, silicon, titanium and zirconium, their carbides (boric carbide, silicon carbide, titanium carbide and zirconium carbide), their oxides (diboric trioxide, silicon dioxide, titanium dioxide and zirconium dioxide), as well as the silicates of titanium and zirconium. In addition to that, sodium compounds such as sodium tetraborate, sodium carbonate, sodium silicate, and sodium chloride are specially used to bring down the point of softening and to make the metallized coating impervious to gases.

It is also possible to apply other chemicals to the welded-on coating, simply by preparing a smear or solution of the respective chemicals which thereafter is applied to the previously welded-on coating. Thus, for example, boric acid and, if desired, additional agents, may be smeared on the welded-on coating.

Diboric trioxide may be melted by heating it to a temperature of about 620° C. and the molten mass may then be applied to the original coating, or the boric acid may be first applied in the form of a suspension or paste, whereafter heating to the indicated temperature is effected. The surface coating obtained in this manner is extremely sensitive to even small amounts of certain metal oxides such as ZnO, PbO and others. The durability of such a diboric trioxide coating is increased manifold if aluminum is then metallized over it.

In the event that a diboric trioxide coating is employed, it is advantageous to apply paraffin to this coating in order to prevent the absorption of moisture, as diboric trioxide is hygroscopic.

From the foregoing, it will have been realized that protective coatings of varying kinds may be readily applied to the carbon material in accordance with this invention. Carbon electrodes which have been coated in the manner described may successfully be used in the production of electric steel. Our experiments have shown that the consumption of graphite electrodes in electric furnaces of a three-ton capacity which produce ordinary carbon steel in a basic process drops from 9.90 kg. of uncoated graphite electrodes per ton of steel to 5.50 kg. in the event that graphite electrodes coated in accordance with this invention are used.

Further, the use of coated graphite electrodes in arc furnaces for steel manufacture makes it easier to obtain compact packing in the furnace.

In the event that carbon or graphite electrodes coated in accordance with this invention are used, the contact sockets should advantageously be made of copper if no cooling for the electrodes is provided.

We have ascertained that electrical resistance rods of graphite coated in accordance with this invention may be used under high temperature conditions reaching 1650° C. without that any destruction or decomposition in the protective coating leading to oxidation of the graphite could be observed.

The invention will now be described by several examples, it being understood, however, that these examples are given by way of illustration and not by way of limitation, and that many change and alterations may be made in choice of raw material, quantities and process conditions in general without affecting in any way the scope and spirit of this invention as recited in the appended claims.

In the following examples, all quantities mentioned refer to one square meter of carbon surface. In all instances, the protective coating is applied to carbon articles of cylindrical shape. For this reason, the term "peripheral speed" as used in the examples denotes the speed of movement of the small graphite cathode electrode relative to the surface on which the coat is to be welded.

Example I

Composition of coating to be welded on carbon article: silicon carbide (Carborundum No. 200) SiC: 250 g., aluminum powder Al: 150 g., titanium oxide ($TiO_2$): 50 g., titanium carbide (TiC): 50 g., titanium (Ti): 50 g., boric carbide ($B_4C$): 30 g., ferrochromium (chromium Cr 70%): 50 g., alloy of molybdenum Mo and boron B (boron 10%): 30 g. The components were thoroughly mixed with a 15% aqueous bone glue solution. The amount of the glue solution was chosen so as to obtain a paste which thereafter was evenly smeared over the surface of the carbon article. This coatings was then welded by twice applying a direct current arc in the manner previously explained. Both welding procedures were effected with a peripheral speed of 6.0 cm. per second, a pitch of 5.3 mm. and current conditions of 160 amperes and a voltage of 30 volts.

A second coating was applied to the first coating after the latter had been welded on. The composition of the second coating was as follows: silicon carbide (Carborundum No. 200) SiC: 200 g., powdered aluminum Al: 200 g., bichromium trioxide $Cr_2O_3$: 40 g., bialuminum trioxide (white corundum No. 200) $Al_2O_3$: 50 g., alloy of titanium Ti and boron B (boron 30%): 30 g., silicon (Si): 40 g., boric acid ($H_3BO_3$): 30 g., chromium (Cr): 50 g. Again, a paste was prepared from the powderous mixture of the components by admixing the components with a bone glue solution and the arc welding was effected as in the case of the first coating.

Example II

The carbon surface is metallized with aluminum according to the known methods of applying metal by spraying in a molten state such as electric-arc metallization, gas metallization, high-frequency metallization or the like.

Metallizing continues until 1 kg. of aluminum is applied on 1 square meter of carbon article. Thereafter, a mixture of the following composition is prepared: silicon carbide (Carborumdum No. 200) SiC: 300 g., powdered aluminum Al: 60 g., titanium dioxide $TiO_2$: 100 g. silicon Si: 50 g., boric acid $H_3BO_3$: 80 g., chromium carbide $Cr_.C_3$: 80 g. and bichromium trioxide $Cr_2O_3$: 100 g. The powderous materials are mixed with a 15% solution of bone glue and are applied on the metallized surface. The welding-on by electric arc is carried out under the following conditions: peripheral speed 7.2 cm./sec., pitch 4.3 mm., current of 240 ampere, and voltage 30 to 35 v.

Example III 750 g. of aluminum are metallized on the carbon surface under the conditions of Example II. Thereafter, a mixture of the following composition is prepared: powdered aluminum Al: 100 g., silicon Si: 200 g., alloy of zirconium Zr and boron B (boron 20%): 100 g., titanium dioxide $TiO_2$: 50 g., bichromic trioxide $Cr_2O_3$: 120 g. and silicon dioxide $SiO_2$: 50 g. The powderous materials are mixed with a 15% solution of bone glue and are applied on the metallizer surface. The welding-on by electric arc is carried out under the conditions of Example II.

This is followed by the metallization of additional 750 g. of aluminum. A mixture of the following composition is prepared: silicon Si: 150 g., zirconium carbide ZrC: 100 g., chromium Cr: 300 g. and boric acid $H_3BO_3$: 150 g. Application and welding-on is carried out under the conditions of Example II.

This is followed by applying and welding-on of a third layer, for which all manipulations for the second layer (metallization, application, welding-on by the arc method) are repeated.

Example IV

A first coat was applied to a carbon article. This first coat had the following composition: silicon carbide (Carborundum No. 200) SiC: 200 g., powdered aluminum Al: 120 g., titanium nitride TiN: 40 g., boron B: 30 g., alloy of aluminum Al and silicon Si (silicon 30%): 80 g., titanium aluminate $TiO_2.Al_2O_3$: 50 g., silicon dioxide $SiO_2$: 40 g., zirconium silicate $ZrO_2.SiO_2$: 50 g. and alloy of chromium Cr and silicon Si (50% silicon): 30 g. The powderous components were mixed in a 15% aqueous solution of bone glue acting as a binder. The paste thus formed was again applied in an even manner to the carbon surface. An electric arc was then generated and the welding performed under the following conditions: peripheral speed 6.0 cm./sec., pitch 10.6 mm., current: 180 amperes, 30 volts. This resulted in a relatively porous layer. In order to render the layer gas impervious, a second electric arc was applied to the porous coat. The conditions of the second arc treatment were as follows: peripheral speed 6.0 cm. per second, pitch 5.3 mm., current: 200 amperes, 30 volts. The coat melted partially during the arc treatment and formed a gas impervious surface.

A second coat was thereafter applied to the first coat. The composition of the second coat was as follows: silicon carbide (Carborundum No. 200) SiC: 100 g., silicon carbide (Carborundum No. 70) SiC: 70 g. powdered aluminum Al: 150 g., bialuminum trioxide (white corundum No. 200) $Al_2O_3$: 80 g., titanium disilicide $TiSi_2$: 50 g., molybdenum carbide MoC: 60 g., molybdenum disilicide $MoSi_2$: 30 g. and titanium silicate $TiO_2 \cdot SiO_2$: 80 g. A paste was prepared from the mentioned components and the paste was applied to the first coat. An electric arc was then generated under the following conditions: peripheral speed 7.2 cm. per second, pitch 8.5 mm., current: 160 amperes, 30 volts. This layer is then metallized with 500 g. of aluminum. The latter is carried out under the same conditions as in Example II.

*Example V*

A first coat had the following composition: silicon carbide (Carborundum No. 200) SiC: 100 g. silicon carbide (Carborundum No. 70) SiC: 100 g., powdered aluminum Al: 190 g., zirconium Zr: 80 g., alloy of zirconium Zr and boron B (boron 20%): 30 g., alloy of zirconium Zr and silicon Si (silicon 20%): 20 g., bialuminum trioxide (white corundum No. 200) $Al_2O_3$: 40 g., and titanium dioxide $TiO_2$: 50 g. These powderous constituents were thoroughly mixed with a 15% aqueous solution of bone glue so as to obtain a paste. The paste was evenly smeared over the carbon article and an electric arc was then produced. The welding conditions were as follows: peripheral speed 6.0 cm. per second, pitch 8.5 mm., current strength 200 amperes, voltage 30 volts.

The coat thus obtained was then metallized with 1000 grams of aluminum. The procedure for metallizing the coat was the same as in the preceding examples. After the first 500 grams of aluminum had been applied to the coat, a paste of the following composition was applied: silicon carbide (Carborundum No. 200) SiC: 50 g., silicon Si: 50 g., zirconium silicate $ZrO_2 \cdot SiO_2$: 50 g., titanium carbide TiC: 50 g. and sodium carbonate $Na_2CO_3$: 50 g., admixed with a 2% aqueous solution of bone glue. The sodium carbonate can be substituted by an equivalent quantity of sodium silicate (water glass) or sodium tetraborate (borax) and up to 20% by sodium chloride.

Thereafter, the remaining 500 grams of aluminum were metallized in the same manner as previously explained.

*Example VI*

A carbon article was coated with a first coat of the following composition: silicon carbide (Carborundum No. 200) SiC: 750 g., titanium dioxide $TiO_2$: 70 g., titanium carbide TiC: 50 g., and silicon dioxide $SiO_2$: 50 g. The components were mixed with a 15% aqueous solution of bone glue in order to form a paste. The paste was spread in a thin layer over the carbon surface, whereafter an electric arc was generated, and welding was effected under the following conditions: peripheral speed 7.2 cm. per second, pitch 8.5 mm., current strength 200 amperes, voltage 30 volts.

A mixture of boric acid ($H_3BO_3$): 550 g., silicon carbide (Carborundum No. 200) SiC: 40 g., silicon Si: 40 g., silicon dioxide $SiO_2$: 30 g., powdered aluminum Al: 30 g. and bialuminum trioxide (white corundum No. 200) $Al_2O_3$: 30 g., with a 5% aqueous solution of bone glue was prepared and spread over the welded-on coat. The entire carbon article was then heated to about 620° C. to smelt the boric acid.

*Example VII*

The layer of smelted diboric trioxide metallizing thereover 500 grams of aluminum in the manner described in Example IV. The aluminum layer was then coated with 500 grams of paraffin.

*Example VIII*

FIGS. 1a and 1b illustrate two carbon articles with plural layers, FIG. 1a corresponding to the composition of Example III and FIG. 1b corresponding to the composition of Example V.

Figure 2:
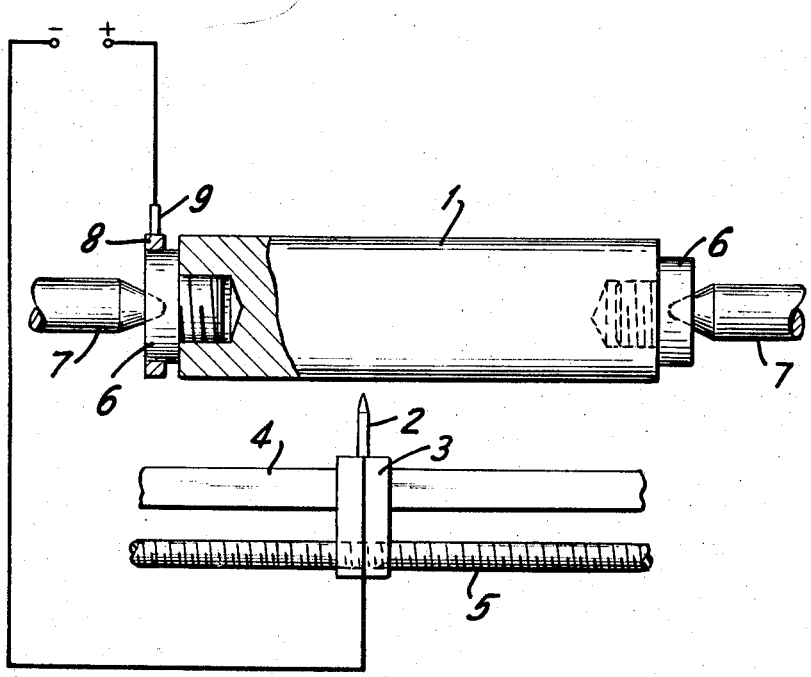

FIGURE 2 is a diagrammatical showing of the welding procedure pursuant to which the coating is welded onto the carbon article by means of an electric arc. In this figure reference numeral 1 denotes the article processed and 2 denotes the lateral electrode fixed in holder 3 which in turn moves along the guide 4 by means of the guiding screw 5. The article 1 is held in position by the two endpieces (holders) 6 in the centers 7 and revolves around its axis. The article 1 is continuously attached to the source of electric current through the brush 8 of the contact ring 9. The lateral electrode 2 is connected to the same source of current by a flexible connection. The electric arc burns between the article 1 and the lateral electrode 2 and it gradually treats the entire surface upon the revolving of the article 1 and upon the longitudinal travel of the lateral electrode 2.

The function of the lateral electrode is to maintain the electric arc. Its composition does not take part in making the coating and it is usually made of graphite. The electric arc affects the article on an area of 8 to 12 mm. in diameter and it heats to a high temperature of a stripe of the same width in the course of its relative movement over the treated surface.

By selecting the electrical pattern and the speed of the relative movement it is possible to obtain a surface heating of about 2,000° C. for 0.1 to 0.3 second, this period of time being sufficient for the course of the desired pyrometallurgical process, namely, the alumino-thermal reactions and the alloying of the desired elements with aluminum. The rapid heating and cooling of the coating in the presence of a large surplus of aluminum makes it possible to carry out the treatment with electric arc in open installations and in ordinary atmosphere without any noticeable oxidation of the components of the coating.

While specific embodiments of the invention have been shown and described in detail to illustrate the application of the inventive principles, it will be understood that the invention may be embodied otherwise without departing from such principles.

What is claimed is:

1. An article of carbon, such as a graphite electrode, having an oxidation preventing coating of a material selected from the group consisting of
   (a) aluminum alloys, wherein the alloying component is selected from the group consisting of boron, silicon, titanium, zirconium, chromium and molybdenum;
   (b) high-melting carbides and nitrides selected from the group consisting of boric carbide, silicon carbide, titanium carbide, zirconium carbide, chromium carbide, molybdenum carbide, tiitanium nitride and zirconium nitride; and
   (c) bialuminum trioxide, said coating consisting of at least one layer formed on the carbon article by first applying the coating forming material to the carbon article and thereafter electric arc treating the material to a temperature above 2,000° C. for less than half a second without substantially heating the carbon article proper.

2. An article as claimed in claim 1, wherein said coating comprises a plurality of superimposed layers each of which is separately applied.

3. An article as claimed in claim 1, wherein said coating of smelted diboric trioxide contains a substance selected from the group consisting of aluminum, silicon, bialuminum trioxide, silicon dioxide and silicon carbide.

4. An article as claimed in claim 1, wherein an outer coating of aluminum, applied by means of metallization, covers said coating of smelted diboric trioxide.

5. An article as claimed in claim 1, wherein said coating contains a layer of smelted diboric trioxide.

6. An article as claimed in claim 1, wherein said coating in turn is coated with a second coating of aluminum applied by means of metallization.

7. An article as claimed in claim 6, wherein said aluminum coating consists of two layers between which there is interposed an intermediate layer consisting of material selected from the group consisting of boron, silicon, titanium and zirconium, their carbides and oxides, titanium silicate and zirconium silicate.

8. A method of forming protective oxidation preventing coatings of
   (a) aluminum alloys, wherein the alloying component is selected from the group consisting of boron, silicon, titanium, zirconium, chromium and molybdenum;
   (b) high-melting carbides and nitrides selected from the group consisting of boric carbide, silicon carbide, titanium carbide, zirconium carbide, chromium carbide, molybdenum carbide, titanium nitride and zirconium nitride; and
   (c) bialuminum trioxide on carbon articles, such as graphite electrodes, which comprises:
   (1) applying the coating forming material to the surface of the carbon article;
   (2) electric arc treating said coating forming material by generating an electric arc between the carbon article with the coating forming material applied thereonto and an electrode laterally spaced from said carbon article;
   (3) moving the electrode and thus the arc at substantially constant speed relative to said carbon article so that the coating forming material is heated to above 2,000° C. for less than half a second while the carbon article proper is not substantially heated, whereby a coating layer is formed on the carbon article which cools substantially instantaneously and has a distinct boundary zone adjacent said carbon article without intermeshing or intertwining with the adjacent carbon surface.

9. A method as claimed in claim 8, wherein said electric arc treatment is carried out in air atmosphere, said lateral electrode being of graphite.

10. A method as claimed in claim 8, wherein the surface of the carbon article is first metallized with a layer of aluminum metal, whereafter a liquid suspension of coating forming material in powder form is applied onto said aluminum layer, said electric arc treatment being carried out upon drying of said suspension, whereby oxidation-reduction alumino-thermal reactions take place at the time of heating.

11. A method as claimed in claim 8, wherein said coating forming material is applied to the surface of said carbon article in form of powder suspended in a liquid, said electric arc treatment being carried out upon drying of the suspension.

12. A method as claimed in claim 8, wherein the electric arc treatment is carried out twice on the same layer.

13. A method as claimed in claim 8, wherein at least a second coating layer is superimposed on the first layer formed on the carbon article by applying coating forming material on the electric arc treated first layer and thereafter electric arc treating said last mentioned coating forming material in substantially the same manner as the coating forming material of the first layer has been treated.

14. A method as claimed in claim 13, wherein metallic aluminum is applied to the second layer.

15. A method as claimed in claim 13, wherein a first metallic aluminum layer is applied to the second layer whereafter a layer of coating forming material is applied to the metallic aluminum layer, said coating forming material layer being subsequently covered with an additional layer of metallic aluminum.

16. A method as claimed in claim 13, wherein the second layer is covered with boric acid, whereupon the entire carbon article is heated at least to the melting point of diboric trioxide.

17. A method as claimed in claim 16, wherein a layer of metallic aluminum is applied onto the layer of diboric trioxide.

References Cited
UNITED STATES PATENTS

| | | | |
|---|---|---|---|
| 650,040 | 5/1900 | Engles | 117—93.1 X |
| 1,924,876 | 8/1933 | Morgan | 117—93.1 |
| 1,982,012 | 11/1934 | Mingard | 117—93.1 |
| 2,592,414 | 4/1952 | Gibson | 117—93 |
| 2,858,411 | 10/1958 | Gage | 219—75 |
| 2,900,281 | 8/1959 | Grams | 117—93.1 X |
| 3,016,311 | 1/1962 | Stackhouse | 117—105.2 X |

FOREIGN PATENTS

| | | |
|---|---|---|
| 894,469 | 4/1962 | Great Britain. |

W. L. JARVIS, *Assistant Examiner.*

ALFRED L. LEAVITT, *Primary Examiner.*